US 6,445,985 B1

(12) United States Patent
Bitzer et al.

(10) Patent No.: US 6,445,985 B1
(45) Date of Patent: Sep. 3, 2002

(54) MOTOR VEHICLE DATA PROCESSING APPARATUS

(75) Inventors: Rainer Bitzer, Weissach; Juergen Bauer, Leonberg; Udo Diehl, Stuttgart; Martin-Peter Bolz, Oberstenfeld; Rainer Mayer, Weil Der Stadt; Uwe Maienberg, Stuttgart; Christian Grosse, Kornwestheim; Marko Poljansek, Reutlingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/273,183

(22) Filed: Mar. 19, 1999

(30) Foreign Application Priority Data

Mar. 20, 1998 (DE) ......................................... 198 12 318

(51) Int. Cl.7 ................................................ G06F 7/00
(52) U.S. Cl. .......................... 701/35; 701/29; 701/32; 309/9.1
(58) Field of Search ........................ 701/29, 32, 35, 701/49; 340/825.31, 825.34, 5.1; 309/9.1, 10.1

(56) References Cited

U.S. PATENT DOCUMENTS

| 4,258,421 A | * | 3/1981 | Juhasz et al. ................ 701/35 |
| 4,839,835 A | * | 6/1989 | Hagenbuch ................... 701/50 |
| 4,933,852 A | * | 6/1990 | Lemelson ............... 364/424.03 |
| 5,827,957 A | * | 10/1998 | Wehinger .................. 73/146.3 |

FOREIGN PATENT DOCUMENTS

| DE | 38 17 495 | 11/1989 |
| DE | 4 038 972 | 11/1991 |
| DE | 42 03 865 | 3/1993 |
| DE | 42 40 447 | 11/1993 |
| DE | 43 40 289 | 6/1994 |
| DE | 94 16 461 | 1/1995 |

* cited by examiner

Primary Examiner—Yonel Beaulieu
(74) Attorney, Agent, or Firm—Kenyon & Kenyon

(57) ABSTRACT

A motor vehicle data processing apparatus includes an operating data acquisition device for acquiring at least one operating data value, in particular engine speed, engine load, and the like, while the vehicle is in operation. The motor vehicle data processing apparatus also includes an operating data processing device for processing the acquired operating data and storing corresponding processed operating data in an associated storage device, and an action determination device for examining the stored processed operating data and determining the need to execute a predetermined action as a function of an examination result according to a predefined criteria.

17 Claims, 1 Drawing Sheet

MOTOR VEHICLE DATA PROCESSING APPARATUS

BACKGROUND INFORMATION

There is a general trend toward a considerable use of information technology ("IT"), in the form of IT platforms, in automobiles. Because of its proximity to the driver and the associated avoidance of long and complex wiring, the dashboard of an automobile is the best candidate for a future concentration of a majority of IT platform electronics.

Conventional IT platform electronics provide a computer (in the region of the dashboard) which provides information to the user about the motor vehicle, and in that context allows an access in a manner similar to that of a personal computer ("PC"). With the computing power usually available (e.g., using a Pentium processor), it is possible to implement new calculation-intensive functions in the computer provided in the dashboard.

An example of one such calculation-intensive function is acquisition, analysis, and management of operating data values, in particular engine speed, engine load, and the like, while the vehicle is in operation. From such operating data values, it is possible not only to draw conclusions regarding the status of the vehicle, but also to derive recommendations for actions such as inspections, part replacements, and break-in instructions, and to take theft protection measures.

The following approaches are known. The customer service file is managed on paper. Data concerning repairs, replacement parts, warranty, etc. are managed separately or not at all. Fleet management data (mileage, fuel consumption, service intervals, government-mandated inspections, etc.) must be acquired and managed separately. Trip recorders exist on paper disks, which are easily tampered with. Radio signals are used to locate stolen vehicles. The driver can assess his or her individual driving style only on the basis of a fuel consumption and a repair frequency.

A systematic approach to the acquisition, processing, and management of operating data has not been in existence.

SUMMARY OF THE INVENTION

Even though an apparatus according to the present invention is applicable to numerous motor vehicles, the present invention is described below with reference to a motor vehicle data processing apparatus which is present on board an automobile.

The motor vehicle data processing apparatus according to the present invention has an advantage that it can systematically acquire, process, and manage motor vehicle operating data, and can inform the driver or owner of the vehicle, comprehensively and at any time, as to the status of the vehicle, and any actions that may be necessary.

The present invention provides (e.g., in the dashboard computer) an electronic trip log and, in conjunction therewith, a predefined program of measures or actions as a function of the operating data. Information concerning the vehicle (which is distributed at the present) can be concentrated at a central point for the driver, owner, repair shop, etc., and is directly and physically correlated with the relevant vehicle. A data consistency can be checked, a rapid access to operating data can be achieved, and a falsification prevention can be ensured via access restrictions.

According to one embodiment of the present invention, the following devices are provided: an Action recording device for recording execution of a predefined action in a memory device and resetting the action determination device, and an access protection device for protecting a write access to the memory device (e.g., in terms of an action record and stored processed operating data) using a predefined authorization function.

According to another embodiment of the present invention, the predefined action is servicing of the vehicle.

According to another embodiment of the present invention, an identification device is provided for identifying an engine control device or devices (and/or other control devices, e.g., a transmission control device, an ABS control device, etc.), and for recording any replacement.

According to another embodiment of the present invention, a display device is provided for displaying a need to perform the predefined action and/or stored display data.

According to another embodiment of the present invention, a driver identification device is provided for identifying the driver and for causing the driver identification to be stored with the operating data.

According to another embodiment of the present invention, an apparatus is provided for compiling a driver profile as a function of the operating data and the driver identification stored therewith. The predefined action includes a preparation of predefined driving recommendations and/or an adaptation of at least one operating data value of at least one engine control device for the driver having a specific driver profile.

According to another embodiment of the present invention, the following devices are provided: a vehicle position detection apparatus (e.g., a Global Positioning System [GPS] apparatus) for detecting the vehicle position, a vehicle presence permit storage device for storing a permitted vehicle presence region, and a comparison device for comparing the detected vehicle position with the permitted vehicle presence region. The action determination device causing the predefined action when the detected vehicle position is not located in the permitted vehicle presence region.

According to another embodiment of the present invention, the predefined action includes a transmission of a radio message and/or a limitation of a vehicle operation by limiting at least one operating data value of at least one engine control device.

According to another embodiment of the present invention, the operating data include an engine speed gradient, an engine speed value, an acceleration, a vehicle speed, a shift frequency, a shift ranges and the like.

According to another embodiment of the present invention, the motor vehicle data processing apparatus is incorporated into a dashboard computer. This offers an advantage of central accessibility.

DETAILED DESCRIPTION

Figure 1:
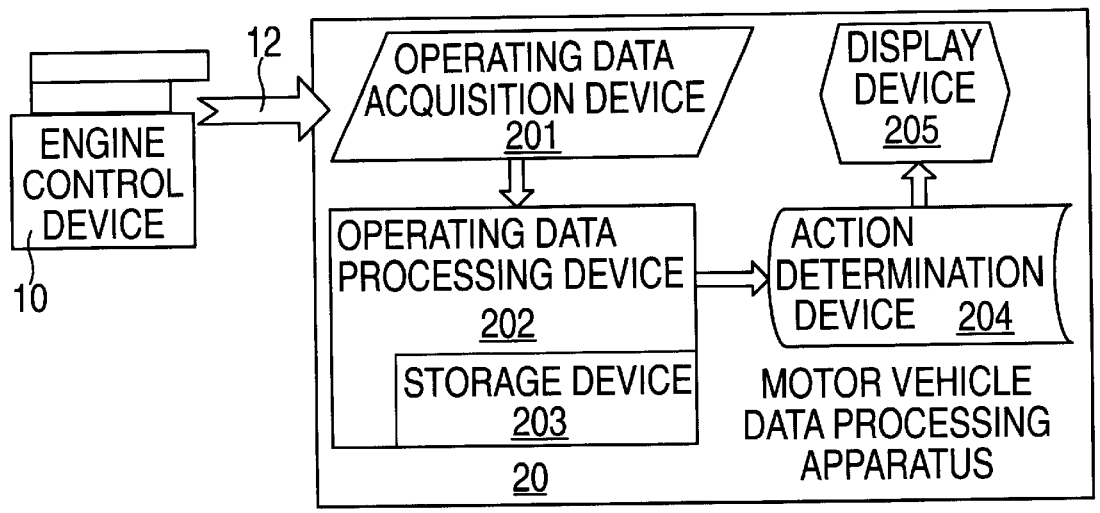
FIG. 1 shows a schematic diagram of a first exemplary embodiment of a motor vehicle data processing apparatus according to the present invention.

FIG. 1 shows a schematic illustration of a basic functional principle of a motor vehicle data processing apparatus according to the present invention.

In FIG. 1, 10 designates an engine control device, 12 a connecting line, 20 a motor vehicle data processing apparatus (e.g., a dashboard computer), 201 an operating data acquisition device, 202 an operating data processing device with a storage device 203, 204 an action determination device (e.g., a counter), and 205 a display device.

The manner of operation of the motor vehicle data processing apparatus configured in this manner is explained in detail below.

In engine control device 10, the torque or load and the speed of the engine are detected by way of usual sensors. These operating data are transmitted at specific intervals, for example 10 ms, via connecting line 12 to operating data acquisition device 201 of motor vehicle data processing apparatus 20. These values are multiplied by one another in operating data processing device 202 in order to obtain an indication of the engine output. The engine output thus obtained is weighted with a characteristic curve stored in memory 203, and the result is summed up and stored.

For example, idle times and an operation at full load are analyzed separately out of the engine output. The results thus obtained are summed in action determination device 204 (e.g., the counter). When a specific value is reached, display device 205 is activated to indicate the need for an inspection. Counter 204 continues to run, however. When the inspection or service has been performed and display device 205 has been reset, the counter status reached to that point, with date and mileage, is stored. The driver can read out these stored values at any time but cannot readily modify them, as will be explained below. Defects due to a neglected maintenance can thereby easily be detected. For leased vehicles in particular, an adherence to specific maintenance cycles is generally strictly prescribed.

Figure 2:
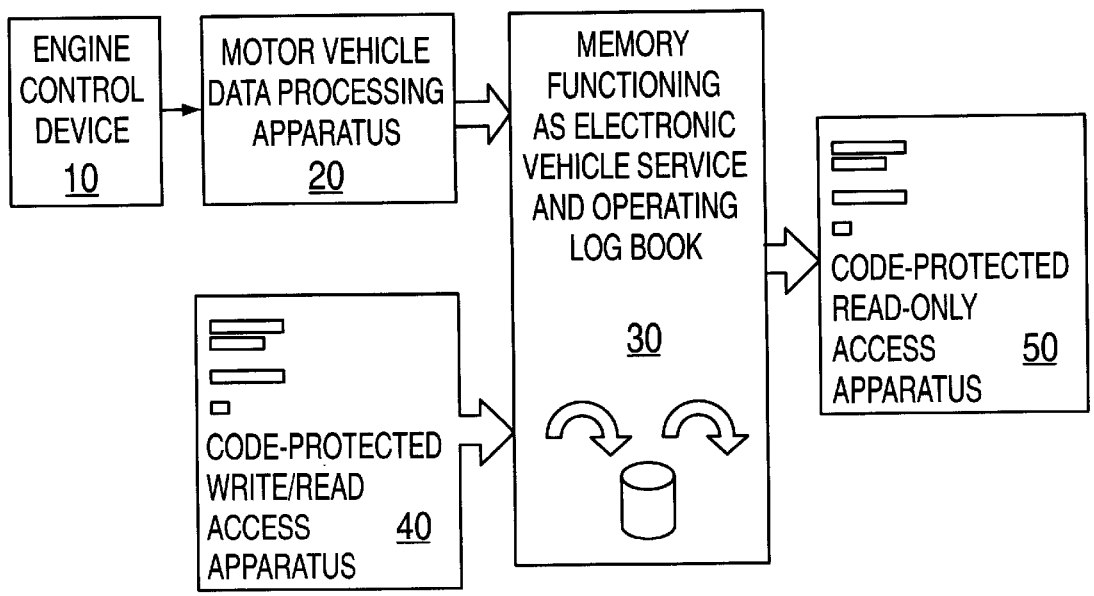
FIG. 2 shows a schematic diagram of a second exemplary embodiment of the motor vehicle data processing apparatus according to the present invention, illustrated using an electronic vehicle service and operating logbook.

FIG. 2 shows a schematic illustration of an exemplary embodiment of the motor vehicle data processing apparatus according to the present invention, in terms of an electronic vehicle service and operating logbook.

In FIG. 2, reference characters identical to those in FIG. 1 designate identical or functionally identical components.

Additionally in FIG. 2, reference character 30 designates a memory which functions as an electronic vehicle service and operating logbook, 40 a code-protected write/read access apparatus for memory 30, and 50 a code-protected read-only access apparatus for memory 30.

After a shop visit for inspection or repair, the repair shop or an authorized person uses an appropriate code to enter into the dashboard computer the work that was performed. The vehicle user cannot do so, however, since with his or her identification code he or she has only read access, but not write access, to these data. A falsification of the information that has been entered is thus not possible.

Continuously or at least after a reset (e.g., after the vehicle battery has been disconnected), the identifier of each of the control devices connected to the data bus is read out; if the identifier for any device has changed, this replacement is automatically recorded. It should not be possible, in this context, for the user to delete the memory contents.

The motor vehicle data processing apparatus according to the present invention also makes it possible to continuously gather data which can be summed up to yield an overall usage profile for the vehicle. For example, the proportion of trips with a cold engine (short-distance trips), the average distance per trip or per day of usage, the average vehicle speed, etc., can advantageously be recorded. The relevant data values are divided into categories, and added up and stored similarly to those for the service interval.

This weighted summing technique has the advantage that only one value per category or per entry, containing the entire history, needs to be stored.

Based on the information from the vehicle operating data acquisition system and the usage profile of the vehicle (driver type, short-/long-distance travel, sporty driving, economical driving, etc.), the dashboard computer can determine and display the time or mileage for the next service or the next part replacement (oil, brakes, air filter, tires, etc.).

Such information is significant for the repair shop and the manufacturer in terms of possible warranty claims. Increased occurrence of specific fault patterns in a vehicle fleet can also thereby be systematically recorded, and correlated with possible causes. The result of this analysis can then be utilized for preventive maintenance on other vehicles having the same usage profile.

User-specific software allows users to determine, analyze, and manage data that are of specific interest to the user. Examples of possible users are taxi operators or motor vehicle rental firms.

For rental vehicles in particular, a permitted operating area can be defined (for example domestic only, or only Western Europe). If it is detected, for example by way of a GPS system, that a border has been crossed, specific control functions or reporting functions are activated, and can be deactivated again by the renter only via coded access. For example, a message can be transmitted via an onboard mobile telephone, or operation of the vehicle can be limited.

In addition, the dashboard computer allows the compilation of driver profiles in accordance with the relevant operating data. These driver profiles can be associated with specific instructions to the driver or to the vehicle, for example teaching programs for efficient driving in terms of fuel consumption and engine wear. The opposite approach is also possible, i.e., adapting the vehicle to the driver profile, for example using specific suspension settings, gear ratios, throttle functions, etc.

Although the present invention has been described above with reference to a preferred exemplary embodiment, it is not limited thereto, but rather can be modified in numerous ways, within the scope of the present invention.

For example, the manner in which the operating data are processed and stored is not limited to the summing process cited above. It is also possible to store a series of operating data with a suitably selected interval between each two acquisition times or acquisition locations.

What is claimed is:

1. A motor vehicle data processing apparatus for use in a motor vehicle, comprising:

an operating data acquisition device for acquiring at least one operating data value when a vehicle is operating;

an operating data processing device for processing the at least one acquired operating data value and storing the at least one processed operating data value in a corresponding storage device;

an action determination device for analyzing the at least one stored operating data value and providing an analysis result, the action determination device determining as a function of the analysis result, whether a predetermined action needs to be performed according to a predetermined criteria;

a display device for displaying information for notifying a user of the need to perform the predetermined action; and an identification device for recording when at least one of at least one engine control device and at least one further control device is replaced.

2. A motor vehicle data processing apparatus for use in a motor vehicle, comprising:

an operating data acquisition device for acquiring at least one operating data value when a vehicle is operating;

an operating data processing device for processing the at least one acquired operating data value and storing the at least one processed operating data value in a corresponding storage device;

an action determination device for analyzing the at least one stored operating data value and providing an analysis result, the action determination device determining, as a function of the analysis result, whether a predetermined action needs to be performed according to a predetermined criteria;

a display device for displaying information for notifying a user of the need to perform the predetermined action;

an action recording device recording an execution of the predetermined action in a memory device and resetting the action determination device; and an access protection device protecting a write access to the memory device using a predetermined authorization function.

3. The motor vehicle data processing apparatus according to claim 2, wherein the access protection device protects the write access to the memory device as a function of an action record and the at least one stored operating data value.

4. The motor vehicle data processing apparatus according to claim 1, wherein the predetermined action is a vehicle service.

5. The motor vehicle data processing apparatus according to claim 1, wherein the identification device identifies at least one of:

the at least one engine control device, the at least one engine control device being is connected to the motor vehicle data processing apparatus, and the at least one further control device, the at least one further control device being is connected to the motor vehicle data processing apparatus.

6. The motor vehicle data processing apparatus according to claim 5, wherein the at least one further control device includes a transmission control device.

7. The motor vehicle data processing apparatus according to claim 1, wherein the display device displays data stored in the motor vehicle.

8. A motor vehicle data processing apparatus for use in a motor vehicle, comprising:

an operating data acquisition device for acquiring at least one operating data value when a vehicle is operating;

an operating data processing device for processing the at least one acquired operating data value and storing the at least one processed operating data value in a corresponding storage device;

an action determination device for analyzing the at least one stored operating data value and providing an analysis result, the action determination device determining, as a function of the analysis result, whether a predetermined action needs to be performed according to a predetermined criteria;

a display device for displaying information for notifying a user of the need to perform the predetermined action; and a driver identification device identifying a particular driver for generating a driver identification data, the driver identification device enabling the driver identification data to be stored with the at least one operating data value.

9. The motor vehicle data processing apparatus according to claim 8, further comprising:

a further apparatus collecting a driver profile as a function of the at least one stored operating data value and the stored driver identification data, wherein the predetermined action includes at least one of:

a preparation of predefined driving recommendations, and an adaptation of the at least one operating data value of at least one engine control device for the particular driver having a predetermined driver profile.

10. The motor vehicle data processing apparatus according to claim 1, wherein the at least one operating data value includes at least one of an engine speed gradient, an engine speed value, an acceleration, a vehicle speed, a shift frequency and shift ranges.

11. The motor vehicle data processing apparatus according to claim 1, wherein the motor vehicle data processing apparatus is provided in a dashboard computer.

12. The motor vehicle data processing apparatus according to claim 1, wherein the at least one operating data value is indicative of at least one of an engine speed and an engine load.

13. A motor vehicle data processing apparatus for use in a motor vehicle, comprising:

means for acquiring at least one operating data value when a vehicle is operating;

means for processing the at least one acquired operating data value and storing the at least one processed operating data value in a corresponding storage device;

means for analyzing the at least one stored operating data value and providing an analysis result, and for determining as a function of the analysis result whether a predetermined action needs to be performed according to a predetermined criteria;

means for displaying information for notifying a user of the need to perform the predetermined action; and at least one of:

means for recording when at least one of at least one engine control device and at least one further control device is replaced;

means for recording an execution of the predetermined action in a memory device and for resetting the action determination device;

means for protecting a write access to the memory device using a predetermined authorization function; and means for identifying a particular driver for generating a driver identification data, and for enabling the driver identification data to be stored with the at least one operating data value.

14. The motor vehicle data processing apparatus according to claim 13, wherein the motor vehicle data processing apparatus includes the means for recording when at least one of at least one engine control device and at least one further control device is replaced.

15. The motor vehicle data processing apparatus according to claim 13, wherein the motor vehicle data processing apparatus includes at least one of the means for recording an execution and the means for protecting a write access.

16. The motor vehicle data processing apparatus according to claim 13, wherein the motor vehicle data processing apparatus includes the means for identifying a particular driver.

17. The motor vehicle data processing apparatus according to claim 14, wherein the motor vehicle data processing apparatus includes the means for identifying a particular driver and at least one of the means for recording an execution and the means for protecting a write access.

* * * * *